(12) United States Patent
Liebermann

(10) Patent No.: US 6,661,133 B2
(45) Date of Patent: Dec. 9, 2003

(54) ROTOR COOLING ARRANGEMENT

(76) Inventor: Eli Liebermann, 11 Malke Dr., Ocean, NJ (US) 07712

( * ) Notice: Subject to any disclaimer, the term of this patent is extended or adjusted under 35 U.S.C. 154(b) by 0 days.

(21) Appl. No.: 09/904,046

(22) Filed: Jul. 12, 2001

(65) Prior Publication Data

US 2003/0193256 A1 Oct. 16, 2003

(51) Int. Cl.⁷ .................................................. H02K 9/00
(52) U.S. Cl. ............................................. 310/58; 310/64
(58) Field of Search .............................. 310/58, 54, 61, 310/64

(56) References Cited

U.S. PATENT DOCUMENTS

| | | | |
|---|---|---|---|
| 2,899,573 A | * | 8/1959 | Wasolowski ................ 310/214 |
| 3,008,786 A | * | 11/1961 | Costello ..................... 310/214 |
| 3,715,610 A | * | 2/1973 | Brinkman .............. 165/104.25 |
| 3,908,140 A | * | 9/1975 | Fidei et al. .................... 310/54 |
| 4,270,065 A | * | 5/1981 | Major ........................ 310/207 |
| 4,943,746 A | | 7/1990 | Scherzinger et al. .......... 310/61 |
| 5,140,204 A | | 8/1992 | Cashmore et al. ............. 310/61 |
| 5,189,325 A | | 2/1993 | Jarczynski ................... 310/54 |
| 5,223,757 A | | 6/1993 | Staub et al. .................. 310/54 |
| 5,444,970 A | | 8/1995 | Kobayashi et al. ........... 57/100 |
| 6,113,024 A | | 9/2000 | Pittard et al. ................ 242/433 |

FOREIGN PATENT DOCUMENTS

JP          09215240 A    *   8/1997   ............ H02K/3/24

* cited by examiner

*Primary Examiner*—Joseph Waks
(74) *Attorney, Agent, or Firm*—Gibbons, Del Deo, Dolan, Griffinger & Wecchione

(57) ABSTRACT

An arrangement for cooling a rotor of a motor, generator or alternator wherein at least one cold plate element is disposed between a rotor pole and its associated winding. One or more cold plate elements surround each pole and are in substantial contact therewith. In addition, each cold plate element is also in substantial contact with the pole winding. As a result, each cold plate element serves to conduct heat from both the pole and its associated winding. To enhance the cooling capabilities of this arrangement, each cold plate element may incorporate passageways for conducting a cooling medium through the element. Advantageously, the resulting rotor assembly is suitable for retrofit into existing applications having strict rotor size and weight requirements. In addition, this assembly is suitable for use in alternators, generators or motors, whether alternating current or direct current.

28 Claims, 7 Drawing Sheets

100

ROTOR COOLING ARRANGEMENT

FIELD OF THE INVENTION

The present invention relates to alternating current ("a.c.") or direct current ("d.c.") generators, alternators, and motors and, more particularly, to a technique for cooling the rotors of such equipment.

BACKGROUND OF THE INVENTION

The windings of equipment, such as generators, alternators and motors, whether a.c. or d.c., must be maintained below some predetermined temperature for proper operation. If not, the insulating material used on the windings will degrade and adversely affect the operation of such equipment. To avoid such degradation, either the current flowing through the windings must be reduced or the heat dissipation capabilities of the equipment must be enhanced. Reducing the current flowing through the windings results in a corresponding power output reduction that is often not compatible with many applications. Accordingly, there has been considerable attention to the development of techniques for enhancing the cooling capabilities of the windings, whether such windings are in the rotor or the stator.

One technique for enhancing heat dissipation in electrical equipment, such as generators, alternators and motors, is to add fins and heat sinks to the equipment. This technique while providing satisfactory results increases both the weight and size of the equipment. It is therefore not suitable for applications, such as aircraft and military applications, where changes in the equipment design must confirm to stringent size and weight constraints. Another technique to increase the heat dissipation capabilities of electrical equipment having windings is to incorporate fluid cooling. In one approach, a cooling fluid is circulated through the equipment housing and rotor shaft. This reduces the temperature of the stator windings but does not substantially reduce the rotor winding temperature. In another technique, the temperature of the rotor winding is reduced by spraying a cooling medium onto the rotor, as it is spinning. The sprayed medium has associated contamination and shorting problems and is not suitable for certain applications. More recently, as disclosed in U.S. Pat. No. 4,943,746 entitled "Liquid Cooled Salient Pole Rotor Support Wedges" to Scherzineger et al., issued Jul. 24, 1990, a liquid medium is conducted through support wedges disposed between each pole of a multi-pole rotor. While this technique serves to reduce the temperature of the rotor winding, it does not cool all of the winding and, does not effectively cool the poles. As a result, it can not provide sufficient rotor cooling for applications requiring certain power output levels from equipment having given size and weight. Accordingly, it would be highly desirable if a technique could be developed that would enhance the cooling of rotor windings in a manner that reduces the size and weight and increases the power output.

SUMMARY OF THE INVENTION

The present invention relates to the cooling of a rotor in a generator, alternator or motor, either a.c. or d.c., having at least one rotor and wherein the rotor has at least two poles. In accordance with the present invention, one or more "cold plate" elements are disposed between the rotor poles and the windings encircling those poles. Each element is preferably fabricated of a material having high thermal conductivity. In the preferred embodiment, each element incorporates one or more passageways for conducting a cooling medium therethrough so as to increase the cooling provided to the surrounding rotor and windings.

In the disclosed embodiment of the present invention, each element engages with a mating element and the resulting pair encircles a rotor pole. The inner surface of each element, i.e., the surface of the element adjacent to the rotor pole, is advantageously shaped so that this entire surface is in contact with the pole. This maximizes the conductive heat transfer from the rotor pole to each element. In addition, the outer surface of each element, i.e., the surface of the element adjacent to the winding encircling that pole, is advantageously shaped so that this entire surface is in contact with the winding. This maximizes the conductive heat transfer coupled from the winding to each element surrounded by that winding.

The use of the element described above advantageously cools both the poles and the windings and does so in a manner that does not increase the size of the overall motor or generator assembly. Accordingly, the present invention is adaptable to both new or existing generator, alternator or motor designs. In addition, it can be utilized in any such equipment having any number of rotor poles.

BRIEF DESCRIPTION OF THE DRAWINGS

For a better understanding of the present invention, reference may be made to the following description of exemplary embodiments thereof, considered in conjunction with the accompanying drawings, in which.

DETAILED DESCRIPTION OF THE DRAWINGS

Figure 1:
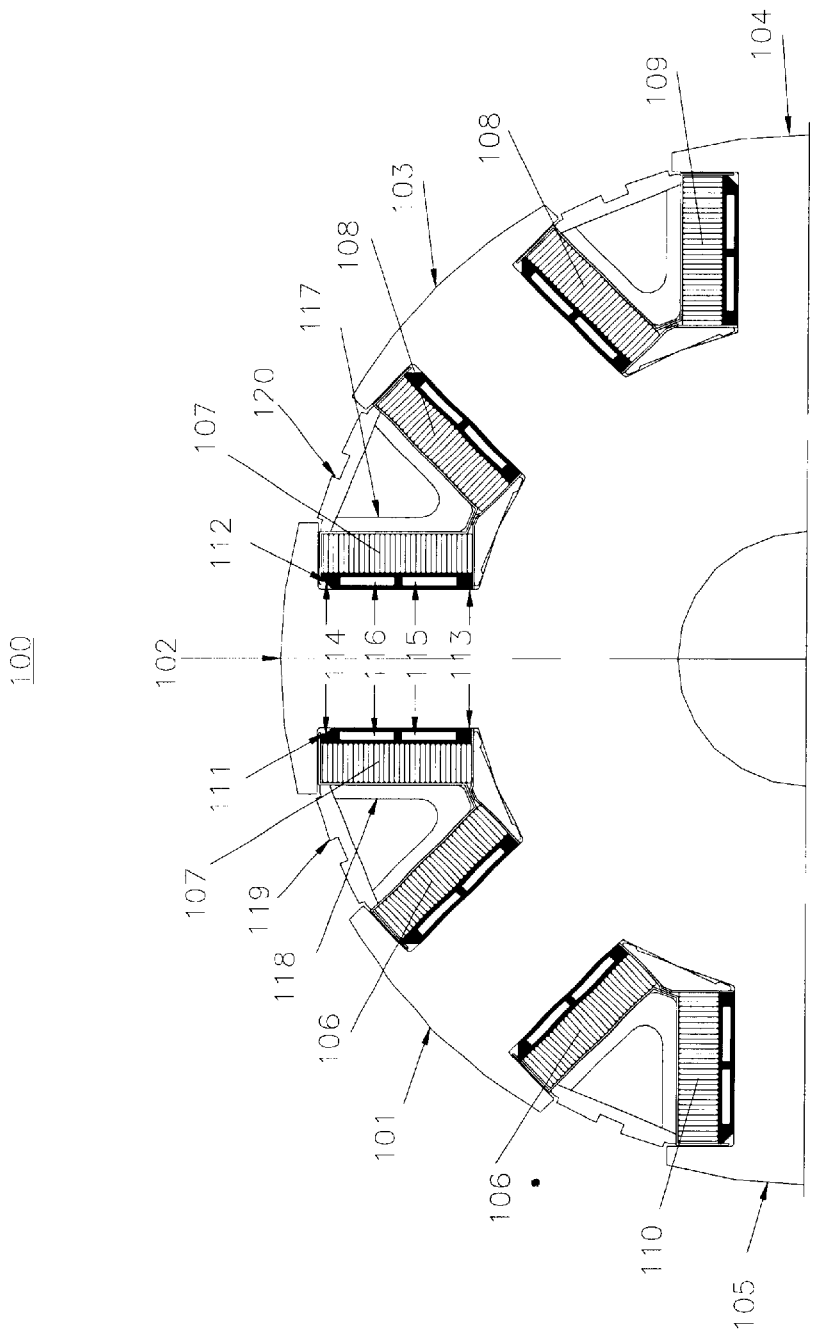
FIG. 1 is a simplified partial end cross sectional view of an illustrative rotor in accordance with the present invention.

Refer now to FIG. 1 which shows an illustrative embodiment of the present invention applied to a rotor 100 having 8 poles. In FIG. 1, poles 101–103 of rotor 100 are shown along with approximately one-half of poles 104 and 105. Poles 101–105 are respectively encircled by windings 106–110. In accordance with the disclosed embodiment of the present invention, a pair of mating "cold plate" elements is disposed between each pole and its associated winding. For purposes of simplicity, the use of cold plate elements with respect to one pole and winding will be described. It is understood, however, that cold plate elements may be used on any number of poles and windings, and that such use is identical to that to be described below with respect to one pole and winding. Obviously, the use of cold plate elements on all of the poles and windings provides the maximum cooling effect.

As shown in FIG. 1, a pair of identical cold plate elements 111 and 112 is shown adjacent to and in contact with pole 102 and its associated winding 107. As will be shown and described in greater detail below, cold plate elements 111 and 112 advantageously contact one another and completely encircle and continuously contact pole 102. Advantageously, the pair of cold plate elements is also completely encircled by and in contact with the winding 107. This maximizes the heat transferred from both the winding 107 and the pole 102 into the cold plate elements 111 and 112. In the cross section of FIG. 1, the region of contact between pole, winding and cold plate elements extends from position 113 to position 114.

Preferably, each of the cold plate elements 111 and 112 includes at least one passageway for conducting a cooling medium therethrough. In FIG. 1, elements 111 and 112 each include a pair of such passageways, designated by reference numerals 115 and 116. In addition, to maintain the structural integrity of the rotor and assure contact between the winding and cold plate elements in high-speed applications, rotor 100 also uses V-shaped wedge elements that press against the external surfaces of adjacent windings. Use of such wedges is known in the art. Each of the V-shaped elements is secured in its position through the action of the V-shaped wedge against the adjacent windings and through the use of a top wedge. Referring to FIG. 1, wedge 117 presses against a portion of the external surface of windings 107 and 108, the latter encircling pole 103. Similarly, wedge 118 presses against another portion of the exterior surfaces of windings 107 and 106, the latter encircling pole 101. Wedges 117 and 118 are respectively retained in their positions through the use of top wedge 120 and 119. Each top wedge lockingly engages with surfaces of adjacent rotor poles, e.g., through the use of a dove tail arrangement.

A suitable cooling medium for use with the cold plate elements, i.e., for conduction through passageways 115 and 116, is oil of the type used for cooling and lubricating engines and gearboxes. However, other liquids or even a gas may be used. Indeed, a cooling medium that changes state, e.g. from a liquid to a gas and absorbs heat during this change in state may be suitable in certain applications.

Figure 2:
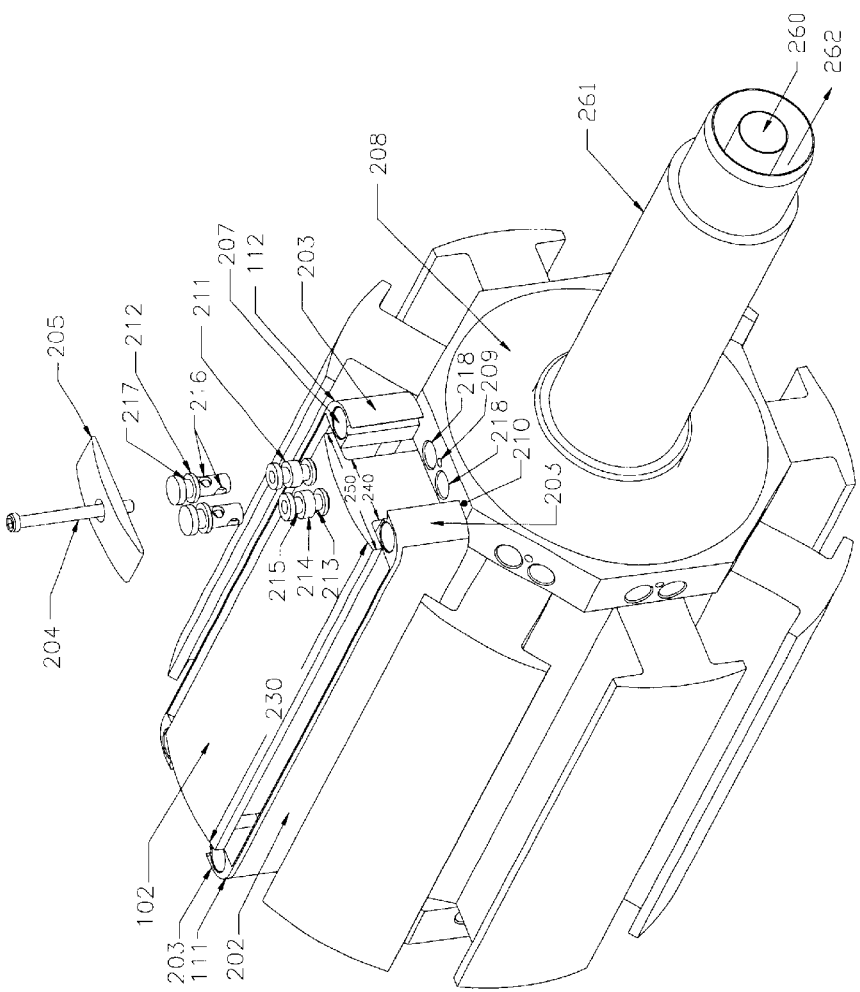
FIG. 2 is a perspective exploded view of the illustrative rotor of FIG. 1.

Refer now to FIG. 2., which shows the use of the cold plates elements in greater detail. It should be noted that each cold plate 111 and 112 encircles approximately one-half of the periphery of pole 102. This periphery includes a depth of 230 and a width 240, the latter extending over what is commonly referred to as the "end turn" region. This region of the pole and the overlying winding is cooled by the cold plate elements 111 and 112. The end face region terminates in what is referred to as a "top hat" of width 250. The top hat, along with other mechanical elements, serves to retain the windings and cold plate elements in their desired position. At this juncture, it should be noted that a benefit of the present invention over the prior art is that the cold plates are in substantial contact with and provide cooling to the encircled rotor pole and the associated winding in both the depth 230 as well as end face 240.

Figure 3:
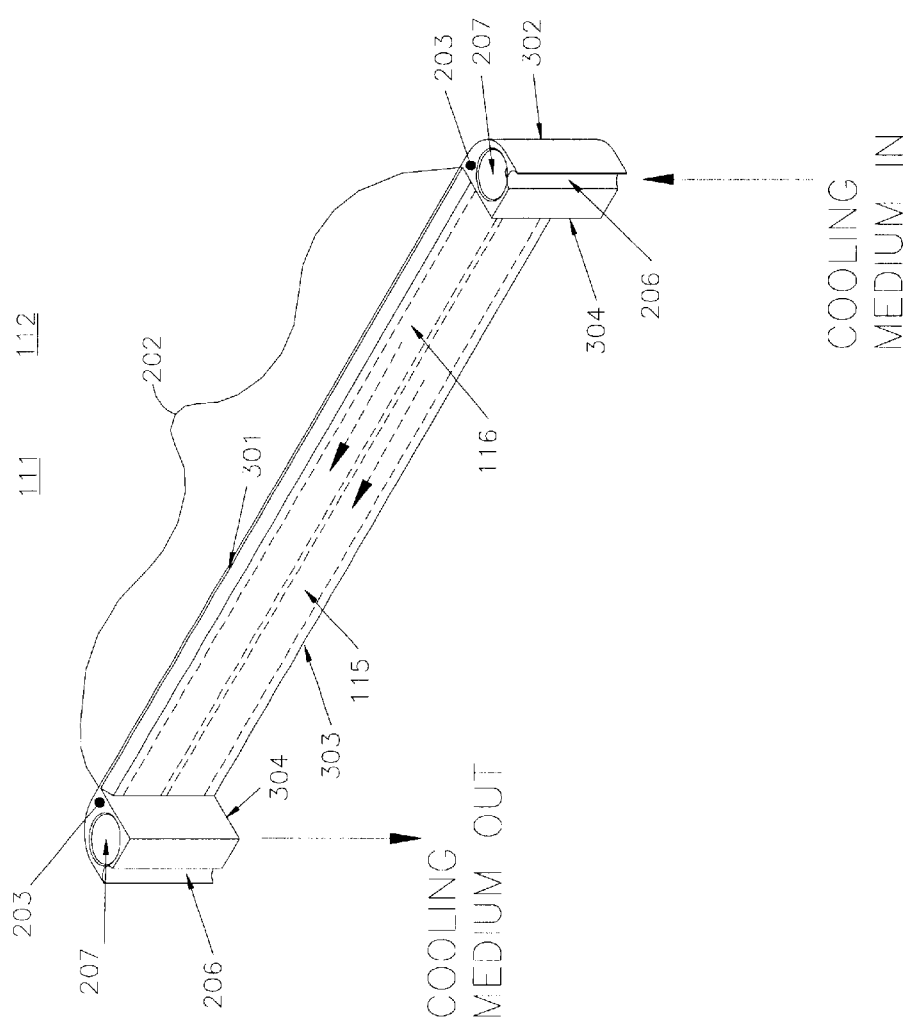
FIG. 3 is a perspective view of an embodiment of a "cold plate" element in accordance with the present invention.

When a pair of identical cold plates 111 and 112 is disposed about pole 102, the ends 203 of cold plate 111 and 112 preferably are in contact with one another. Each of cold plates 111 and 112 is retained in its desired position during assembly through the use of transfer tubes 211, plugs 212, cap 205 and screw 204. Cap 205 extends over the ends of plugs 212 and is held in position by the engagement of screw 204 with threaded hole 209 in manifold 208. Each cold plate incorporates a semicircular channel 206 that contacts one half of the circumference of screw 204. This channel is shown in FIG. 3. Referring to FIG. 2, a pair of transfer tubes and plugs and a cap and a screw are shown in the foreground. For purposes of simplicity, this same group of elements is not shown in the background portion of FIG. 2.

Refer now to FIG. 3. Each cold plate is essentially flat in a section 202 whose opposite ends, as discussed, terminate in one of a pair of curved ends 203. Each cold plate, to enhance its cooling capabilities, includes at least one passageway for the conduction of a cooling medium. In the disclosed embodiment, these conducting passageways are designated as 115 and 116. As shown in FIG. 3, each of the passageways 115 and 116 extend from one through hole 207 disposed in an end 203 of a cold plate to a through hole 207 in another end 203 of that cold plate. To enhance the heat transfer capabilities of cold plate elements 115 and 116, the outer surfaces 301 and 302 of each cold plate are preferably shaped with the windings disposed about the cold plate. This latter surface substantially matches the bend radius of the wires used to form the windings. At this juncture, it should be noted that the use of cold plate elements in accordance with the present invention does not increase the size of the resulting overall rotor assembly and, therefore, can be retrofitted into existing applications. The reason for this is apparent when it is noted that the cold plates fit between a pole and its windings. In the region between adjacent poles, there is sufficient room to accommodate both the cold plates and the windings. Furthermore, in the end turn region, the cold plates fit in the space formed between the rotor and windings, such space arising from inherent nonzero bend radius of the winding wire.

Each cold plate element is preferably fabricated of a material having high thermal conductivity, such as aluminum, copper or brass. The cold plate element can be fabricated using conventional manufacturing techniques. In one technique, a flat block is machined with two longitudinal grooves extending over the length of the block and end sections 203 having through hole 207 and an intersecting radial hole, so that there is a continuous passageway between the through hole and the grooves. A flat plate is then brazed over the block so as to convert the grooves into a closed passageway open only at the ends 203. While the winding wires typically have an outer electrically insulating layer, the cold plate preferably includes its own electrically insulating layer so as to reduce the likelihood of a short circuit between the windings and a cold plate element. When aluminum is used for the cold plate, the insulating material is aluminum oxide having a thickness of 5–10 thousandths of an inch. The insulating layer is formed using conventional techniques.

The wires used in forming each winding preferably have a rectangular cross section with the smaller dimension of the rectangle disposed toward the pole surface and the larger dimension of the rectangle substantially perpendicular to the pole surface. This orientation facilitates bending of the wire around the pole. Moreover, a rectangular cross section provides better heat transfer characteristics than those provided by wires having an equivalent circular cross section. This benefit results from the increased area of contact between adjacent wires in a winding. In this regard, it should be noted that with a rectangular cross section, each wire in the winding either directly contacts the cold plate elements or contacts such elements through other winding wires. Further, the contact between adjacent winding wires is along the entire length or width of the wire cross section. In contrast, when wires having a circular cross section are used, the adjacent wires in a winding cross section contact one another only at a point. In addition, the packing density for wires having a rectangular cross section is greater than that for round wires since there is virtually no space between winding wires. As a result, for a winding having a given cross section, there is a greater fill factor (material/volume) provided by wires having a rectangular cross-section than by wires having a circular cross section.

Figure 4:
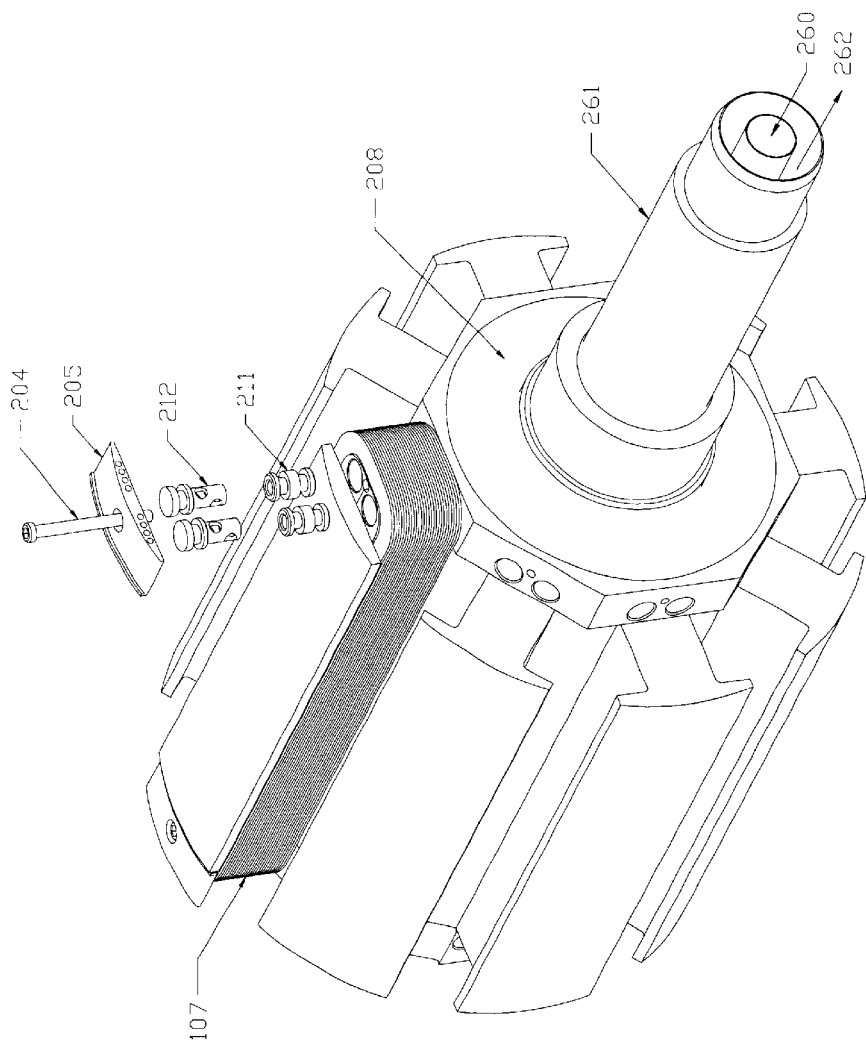
FIG. 4 is a perspective partially exploded view of the illustrative rotor of FIG. 1 depicting windings disposed about a rotor pole.

FIG. 4 shows a rotor 100 with winding 107 disposed about one pole. The cooling plate elements 111 and 112 are disposed between the pole and the winding. The transfer tubes 211 and plugs 212 are shown in an exploded view for illustrative purposes.

Refer back now to FIG. 2. To provide a closed system for the conduction of a cooling medium, rotor 100 incorporates a pair of identical first and second manifolds 208, each located at opposite ends of the rotor 100. In FIG. 2, one such manifold, designated as the first manifold is shown in the foreground and, for purposes of simplicity, the second manifold, in the background portion of FIG. 2, is not shown. Each manifold 208 is formed with holes 218 in surface 210. Each hole 218 is adapted to receive a transfer tube 211 that, in turn, is adjacent to plug 212. One transfer tube and one plug are disposed in each hole 207 of a cold plate element. Of course, these two parts could be combined into a single element. While a pair of transfer tubes 211 and a pair of plugs 212 are shown in FIG. 2, it should be understood that a pair of such tubes and a pair of such plugs are used at each end turn of a rotor pole. For purposes of simplicity, the transfer tubes and plugs for only one end turn region of pole 102 is shown in FIG. 2; the identical pairs of transfer tubes and plugs for the end turn region in the background portion of pole 102 have not been shown.

Figure 5:
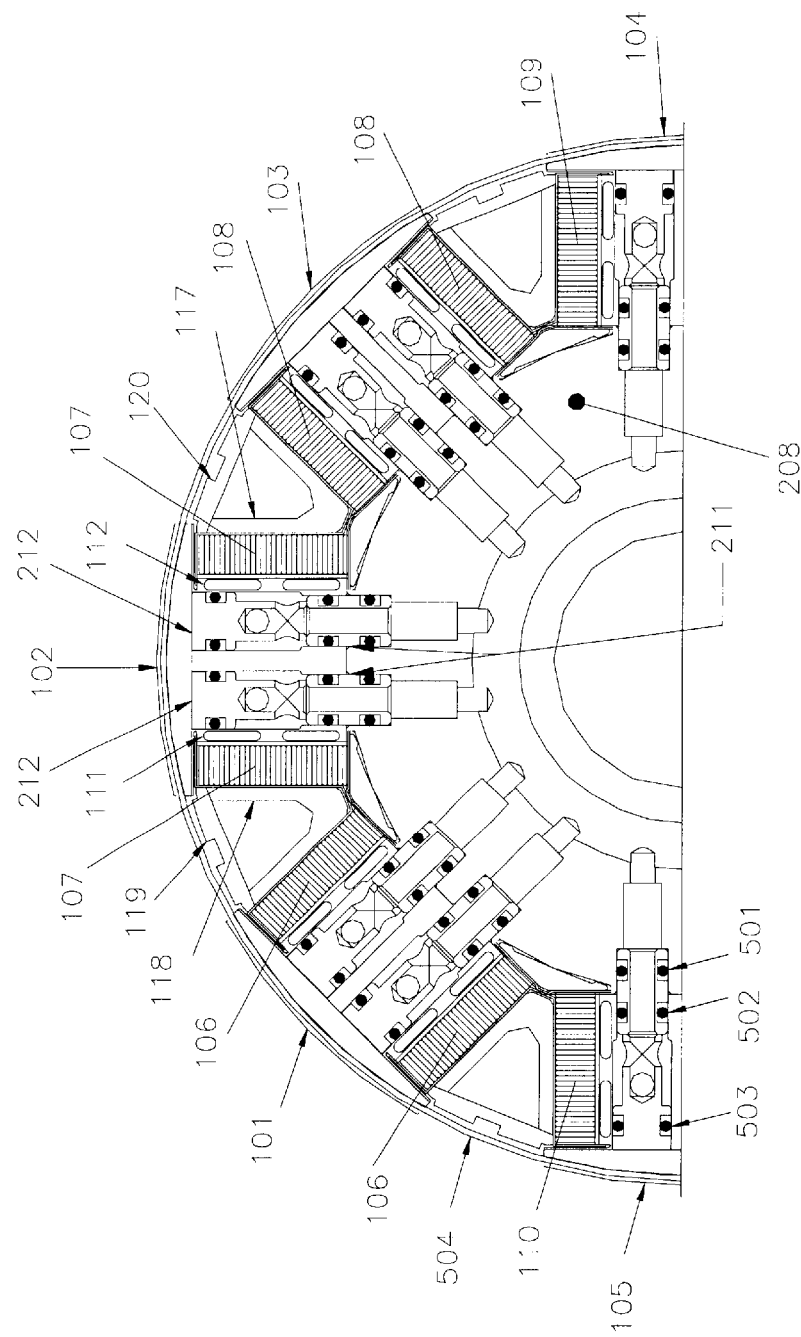
FIG. 5 is partial end cross sectional view of the rotor of FIG. 2 taken through the transfer tubes 211 and plugs 212.

Transfer tube 211 is formed with annular regions 213, 214 and 215. The diameter of region 214 is such so as to slidingly engage with hole 218. Regions 213 and 215 each have a smaller diameter than that of region 214 and are designed to accept and retain an O-ring seal. Similarly, plug 212 is formed with an annular region 217 that also receives an O-ring seal. The seals in regions 213 and 215 prevent leakage of the cooling medium between the manifold and a cold plate element while the seal in region 217 prevents leakage out of the end of the plug. As will be described, to prevent leakage of the cooling medium between the cold plate element and the manifold, the O-ring disposed in region 213 is disposed just below the surface 210 of manifold 208 while the O-ring disposed in region 215 is disposed just above this surface. FIG. 5 shows the interrelationship of O-ring seals, the transfer tubes, plugs, manifold and cold plate elements in greater detail. As shown in FIG. 5, the O-ring disposed in region 213 and 215 of transfer tube 211 are respectively designated as 501 and 502 while the O-ring disposed in region 217 of plug 212 is designated as 503. End turn band 504 encircles the rotor and serves to retain the caps, transfer tubes, plugs, windings and cold plates in their respective positions during rotor operation.

Figure 6:
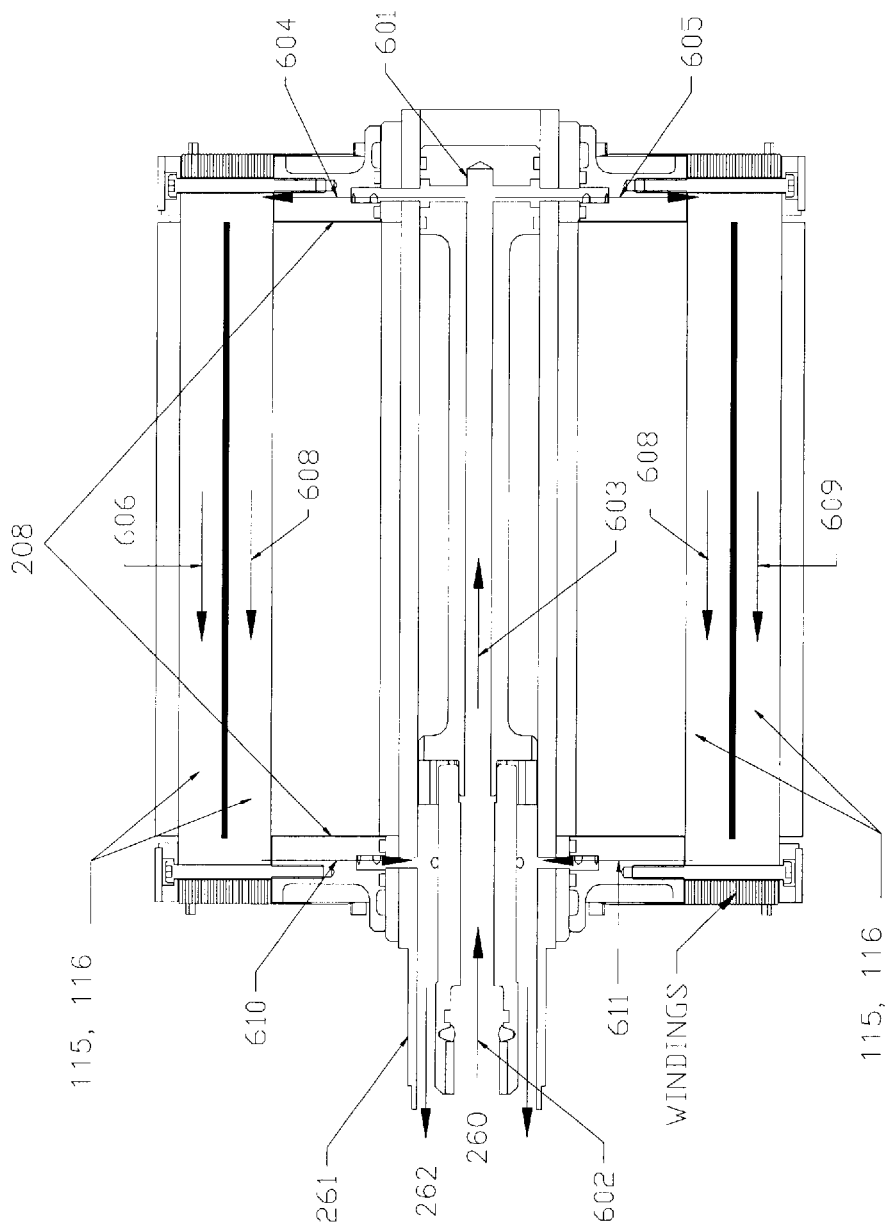
FIG. 6 is a side cross sectional view of an illustrative generator incorporating the rotor of FIG. 2 and depicting the flow of cooling medium.

The flow of cooling medium will now be described in reference to FIGS. 2 and 6. In the disclosed embodiment, this flow is in a closed system with the cooling medium, at a first temperature, entering rotor 100 through passageway 260 shown in FIG. 2. As shown in FIG. 6, the medium in passageway 260 exits at location 601 and enters a first manifold 208 disposed at a first end of rotor 100. The medium then exits from a hole 218 in this manifold and passes into one hole 207 of a cold plate element via a transfer tube and plug.

The details of the transfer tubes and plugs will now be described in reference to FIG. 2. The cooling medium passes through the open bore in transfer tube 211 and enters the closed bore in adjacent plug 212. As this bore is closed, the cooling medium exits the plug through at least one hole 216 formed in the circumference thereof. The cooling medium exiting holes 216 is now within hole 207 of a cold plate element. Hole 207, as previously described in reference to FIG. 3, intersects with passageways 115 and 116 of a cold plate element. Accordingly, the cooling medium exiting into a hole 207 at one end of a cold plate proceeds through passageways 115 and 116 of that cold plate and then enters into hole 207 at the other end of the cold plate. The cooling medium then proceeds through circumferencial holes 216 in plug 212 and thence through transfer tube 211 in a manner opposite to that described above. Upon doing so, the cooling medium then enters a second manifold that is located at second end of rotor 100. This second end is opposite to the first end of the rotor.

Refer now to FIG. 6. The flow of cooling medium exits bore 260 at location 601. The flow through the bore is indicated by arrows 602 and 603. Arrows 604 and 605 indicate the flow of cooling medium out of passageway 260 into a manifold 208 at the first end of rotor 100. Arrows 606–609 depict the flow of cooling medium through passageways 115 and 116, shown in FIG. 3, of a cold plate element. The cooling medium exiting these passageways and entering the second manifold via plugs and transfer tubes is depicted by arrows 610 and 611. The cooling medium is now at an elevated temperature compared to that entering passageway 260. The cooling medium in this second manifold then exits rotor 100 via passageway 262 of shaft 261. Passageway 262 is concentric with passageway 261. The cooling medium in passageway 262 is then conducted to a heat sink (not shown), such as a reservoir with heat exchanging capabilities wherein the temperature of the cooling medium is reduced to the first temperature. Advantageously, this system can be adapted to also conduct the cooling medium through the housing of the illustrative generator, motor or alternator and thereby also cool the stator windings.

Figure 7:
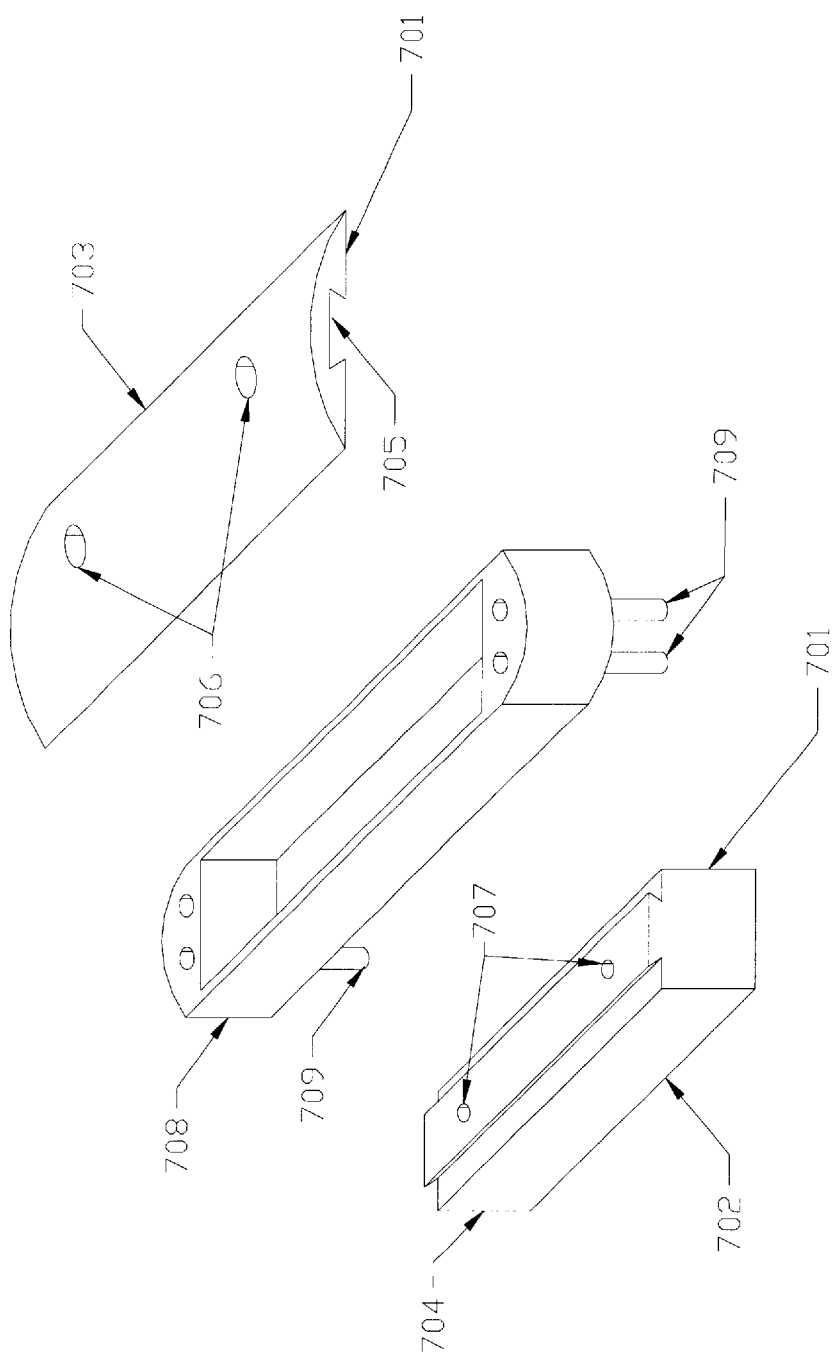
FIG. 7 is a perspective view of another embodiment of a cold plate design suitable for rotor cooling.

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein. For example, while in the disclosed embodiment, the cold plate elements at each end turn of a rotor pole include a pair of elements, a single unitary cold plate element can be used. The use of a single cold plate element for a pole can be accommodated by modifying a rotor pole so that the top hat section is removable from the remainder of the pole. This is shown in FIG. 7 wherein one two-piece pole 701 of a rotor is shown. Pole 701 includes a main section 702 and a top hat section 703, the latter being secured to the former through any number of mechanisms, such as screws or other fasteners. In FIG. 7, main section 702 and top hat section 703 advantageously incorporate dovetail features 704 and 705 along with one or more holes 706 in the top hat section and corresponding blind threaded holes 707 in the main section. In FIG. 7, the cold plate element is a unitary annular structure 708 which is designed to fit around pole 701 and be in contact with this pole and its associated winding in the same manner as described hereinabove. Cold plate element 708 can incorporate ports 709 at both ends of the element as shown in FIG. 7 for carrying the cooling medium from a first manifold to the element and back to a second manifold. O-ring seals of the type described in reference to FIG. 2 may be used with ports 709 for sealing purposes. The flow of the cooling medium is analogous to that shown in FIG. 6. If, on the other hand, element 701 incorporates ports 709 at one end only, then, only one manifold is necessary for the rotor and the cooling fluid passes from this manifold through the unitary element and back to the manifold. Preferably, to enhance the cooling capabilities of this structure, the single manifold is internally divided so that the returning cooling medium is segregated from the entering cooling medium.

What is claimed is:

1. A rotor for electrical equipment, said rotor having at least one pair of poles, each pole having a length and a width and a winding encircling said length and said width, and said rotor comprising at least one element fabricated of heat conductive material, said element being separate from said poles and said winding, said element being disposed between at least one of said poles and its encircling winding, said element extending along said length between a first and a second location then and then turning at said second location to form an extension that extends a predetermined distance along said width.

2. The rotor of claim 1 wherein each element has a first surface adjacent to said winding and formed so as to be in substantial contact therewith.

3. The rotor of claim 2 wherein each element has a second surface adjacent to said pole and formed to be in substantial contact therewith.

4. The rotor of claim 1 wherein each element has a first surface adjacent to said pole and formed so as to be in substantial contact therewith.

5. The rotor of claim 4 wherein each element has a second surface adjacent to said winding and formed so as to be in substantial contact therewith.

6. The rotor of claim 1 wherein each element includes at least one passageway for the conduction of a cooling medium therethrough.

7. The rotor of claim 6 wherein said rotor includes at least one manifold for receiving a cooling medium.

8. The rotor of claim 7 further including at least one coupling member for transporting the cooling medium from the manifold to each passageway.

9. The rotor of claim 8 wherein said rotor includes a shaft having a cooling medium conducting passageway therethrough.

10. The rotor of claim 1 wherein said winding is fabricated of wire having a rectangular cross section.

11. The rotor of claim 10 wherein said wire is solid.

12. The rotor of claim 1 wherein said element is a unitary member.

13. The rotor of claim 1 wherein said element includes a pair of mating members, each member extending over a different non-overlapping region between the rotor pole and its encircling winding.

14. The rotor of claim 1 wherein said element extends along the entire length and width of said at least one of said poles.

15. The rotor of claim 1 wherein said element encircles said at least one of the poles.

16. Electrical equipment comprising a housing;

a stationary winding disposed within said housing and forming an aperture;

a rotor disposed within said aperture, said rotor including at least one pair of poles, each pole having a length and a width and a winding encircling said length and said width; and at least one element fabricated of heat conductive material, said element being separate from said poles and said winding, said element being disposed between at least one of said poles and its encircling winding, said element extending along said length between a first and a second location and then turning at said second location to form an extension that extends a predetermined distance along said width.

17. The equipment of claim 16 wherein said equipment is an alternator.

18. The equipment of claim 16 wherein said equipment is a generator.

19. The equipment of claim 16 wherein said equipment is a motor.

20. The electrical equipment of claim 16 wherein said element extends along the entire length and width of said at least one of said poles.

21. The electrical equipment of claim 16 wherein said element encircles said at least one of the poles.

22. A method of cooling a rotor for electrical equipment, said rotor having at least one pair of poles and each pole having a length and a width and a winding encircling said length and said width, said method comprising the steps of providing at least one element fabricated of heat conductive material; and disposing said element between each rotor pole and its encircling winding, said element extending along said length between a first and a second location and then turning at said second location to form an extension that extends a predetermined distance along said width.

23. The method of claim 22 wherein said element extends along the entire length and width of said at least one of said poles.

24. The method of claim 22 wherein said element encircles said at least one of the poles.

25. A rotor for electrical equipment, said rotor having at least one pair of poles, each pole having at least two intersecting pole surfaces and a winding encircling these surfaces, and said rotor comprising at least one element fabricated of heat conductive material, said element being disposed between at least one of said poles and its encircling winding, said element having a bend so that said element wraps around and extends along said two intersecting pole surfaces.

26. A rotor for electrical equipment, said rotor having at least one pair of poles, each pole having at least two intersecting pole surfaces and a winding encircling these surfaces, and said rotor comprising at least one element fabricated of heat conductive material, said element being disposed between at least one of said poles and its encircling winding, each element having a first nonplanar surface that is adjacent to said two intersecting pole surfaces.

27. Electrical equipment comprising a housing;

a stationary winding disposed in said housing and forming an aperture;

a rotor disposed in said aperture, said rotor including at least one pair of poles, each pole having at least two intersecting pole surfaces and a winding encircling these surfaces, and at least one element fabricated of heat conductive material, said element being disposed between at least one of said poles and its encircling winding, each element having a first nonplanar surface that is adjacent to said two intersecting pole surfaces.

28. A method of cooling a rotor for electrical equipment, said rotor having at least one pair of poles, each pole having at least two intersecting pole surfaces and a winding encircling these surfaces, said method comprising the steps of providing at least one element fabricated of heat conductive material, each element having a nonplanar surface; and disposing said element between each rotor pole and its encircling winding, said nonplanar surface of said element being adjacent to said two intersecting pole surfaces.

* * * * *